(12) United States Patent
Gelnett

(10) Patent No.: US 8,104,397 B2
(45) Date of Patent: Jan. 31, 2012

(54) GAS METERING DIAPHRAGM

(75) Inventor: Leland E. Gelnett, Indiana, PA (US)

(73) Assignee: M&FC Holding, LLC, Wilmington, DE (US)

( * ) Notice: Subject to any disclaimer, the term of this patent is extended or adjusted under 35 U.S.C. 154(b) by 503 days.

(21) Appl. No.: 12/241,234

(22) Filed: Sep. 30, 2008

(65) Prior Publication Data

US 2010/0077852 A1    Apr. 1, 2010

(51) Int. Cl.
*F16J 3/02* (2006.01)

(52) U.S. Cl. .............................. 92/104; 92/99; 92/103 F

(58) Field of Classification Search .................. 92/98 R, 92/98 D, 103 F, 104, 99
See application file for complete search history.

(56) References Cited

U.S. PATENT DOCUMENTS

| | | |
|---|---|---|
| 356,997 A | 2/1887 | Gil |
| 2,742,785 A * | 4/1956 | St Clair ............................ 92/104 |
| 2,751,935 A | 6/1956 | Smith |
| 2,760,260 A | 8/1956 | Melchior |
| 2,874,569 A | 2/1959 | Gray |
| 3,659,448 A | 5/1972 | Schaus |
| 3,802,267 A | 4/1974 | Lofink |
| 3,834,231 A | 9/1974 | Hisada |
| 4,014,212 A | 3/1977 | Douglas |
| 4,091,668 A | 5/1978 | Namikawa et al. |
| 4,706,496 A | 11/1987 | Hicks |
| 4,809,589 A | 3/1989 | Bertrand |
| 4,856,331 A | 8/1989 | Roese et al. |
| 5,335,584 A * | 8/1994 | Baird .............................. 92/98 R |
| 5,410,945 A * | 5/1995 | Schops et al. ................. 92/98 R |
| 5,415,032 A | 5/1995 | Swain et al. |
| 5,422,064 A | 6/1995 | Tamura |
| 5,594,167 A | 1/1997 | Ward |

FOREIGN PATENT DOCUMENTS

| | | |
|---|---|---|
| GB | 239923 | 9/1925 |
| GB | 2190656 | 11/1987 |
| WO | 0012969 | 3/2000 |

OTHER PUBLICATIONS

International Search Report dated Nov. 16, 2009.

* cited by examiner

*Primary Examiner* — Michael Leslie
(74) *Attorney, Agent, or Firm* — Andrus, Sceales, Starke & Sawall, LLP

(57) ABSTRACT

A diaphragm for use in a gas meter that includes an expansion section having a series of convolutions. During repeated use of the diaphragm, the expansion section flexes to allow the center section of the diaphragm and the attached diaphragm disk to move between a retracted position and extended position. The convolutions formed in the expansion section include a series of curved peaks and curved troughs joined by web sections. The multiple convolutions in the expansion section allows for more consistent and repeatable movement and volume displacement of the diaphragm between the extended and retracted positions. The action of the convolutions also contributes to extended life by eliminating wrinkling of the diaphragm material.

8 Claims, 4 Drawing Sheets

GAS METERING DIAPHRAGM

BACKGROUND OF THE INVENTION

The present disclosure generally relates to a diaphragm-type gas meter for determining the usage of a gas product. More specifically, the present invention relates to an improved diaphragm for use in a diaphragm-type gas meter to provide more consistent metering and extended diaphragm life.

Positive displacement gas meters have long been used to determine the amount of gas usage by a consumer. Particularly, where gas flow rates are relatively low, such as at the gas inlets of homes and small buildings, diaphragm meters are used to measure gas consumption. Diaphragm meters are connected to a supply pipe that delivers pressurized gas from an external source. An outlet pipe runs from the diaphragm gas meter to the inside of the house or building to supply the metered gas to the building.

When a gas burning device, such as a stove or furnace, is activated, gas begins to flow into the enclosed housing of the meter. Diaphragm meters measure the amount of gas consumed in the following manner. Initially, a valve in the diaphragm meter is in a first position in which gas flows into the enclosed housing on one side of the diaphragm enclosed within the diaphragm meter. As the first side of the diaphragm expands outward due to the pressure of the gas flowing into the enclosed housing, gas on the opposite side of the diaphragm is forced out of the diaphragm meter to the outlet pipe. As the diaphragm moves due to the pressure of gas from the supply, the diaphragm rotates the flag axle with an arm attached to one end. The arm forces the metering components within the meter to move, which rotates dials to indicate the amount of gas usage. The flag axle also has a crankshaft attached to an arm that moves internal valving within the diaphragm meter. Movement of the valving uncovers another passage that exposes the opposite side of the diaphragm to the pressurized gas. Thus, as gas is continually used by the consumer, the diaphragms reciprocate between two different positions, where each movement causes a dial within the meter to rotate to indicate gas consumption.

As the above description indicates, the diaphragms within the diaphragm-type gas meter continuously reciprocate between extended and retracted positions. This movement of each the diaphragm must be consistent to provide a repeatable volume displacement for an accurate reading by the gas meter. Further, since gas meters are typically left in the field for numerous years, the diaphragm must be durable over the life period of the gas meter.

SUMMARY OF THE INVENTION

The present disclosure generally relates to a diaphragm assembly for use in a gas meter. More specifically, the present invention relates to a diaphragm for use in a gas meter that includes a series of spaced convolutions that allow the diaphragm to more accurately displace a constant volume between a retracted position and an extended position.

The diaphragm of the present disclosure includes a generally circular center section although oval and squared configurations are also possible. The center section receives a diaphragm disk having an attachment bracket that receives a flag rod of the metering assembly. As the diaphragm moves between a retracted position and an extended position, the diaphragm disk rotates the flag rod, thereby resulting in metering of the gas being consumed by the metered facility.

The diaphragm further includes an expansion section that extends around the center section. The expansion section is attached to an attachment section that allows the diaphragm to be secured to a diaphragm pan. Preferably, the center section, the expansion section and the attachment section are formed from a single material. However, it is contemplated that the diaphragm could be formed from multiple materials, as desired.

The expansion section of the diaphragm includes a series of spaced convolutions that allow the diaphragm to flex from the retracted position and move to the extended position. Preferably, each of the convolutions are spaced from each other in concentric rings within the expansion section.

Each of the convolutions includes a curved peak joined to a corresponding curved trough by a connecting web. As the diaphragm moves from the retracted position to the extended position, each of the curved peaks and curved troughs flex to allow the diaphragm to move to the extended position.

Since the expansion section includes a series of convolutions formed in concentric rings, the expansion section allows the diaphragm to flex outward in a more controlled and known manner. Further, the curved convolutions of the expansion section increase the durability of the diaphragm over repeated movements between the extended and retracted positions.

BRIEF DESCRIPTION OF THE DRAWINGS

The drawings illustrate the best mode presently contemplated of carrying out the invention. In the drawings.

DETAILED DESCRIPTION OF THE INVENTION

Figure 1:
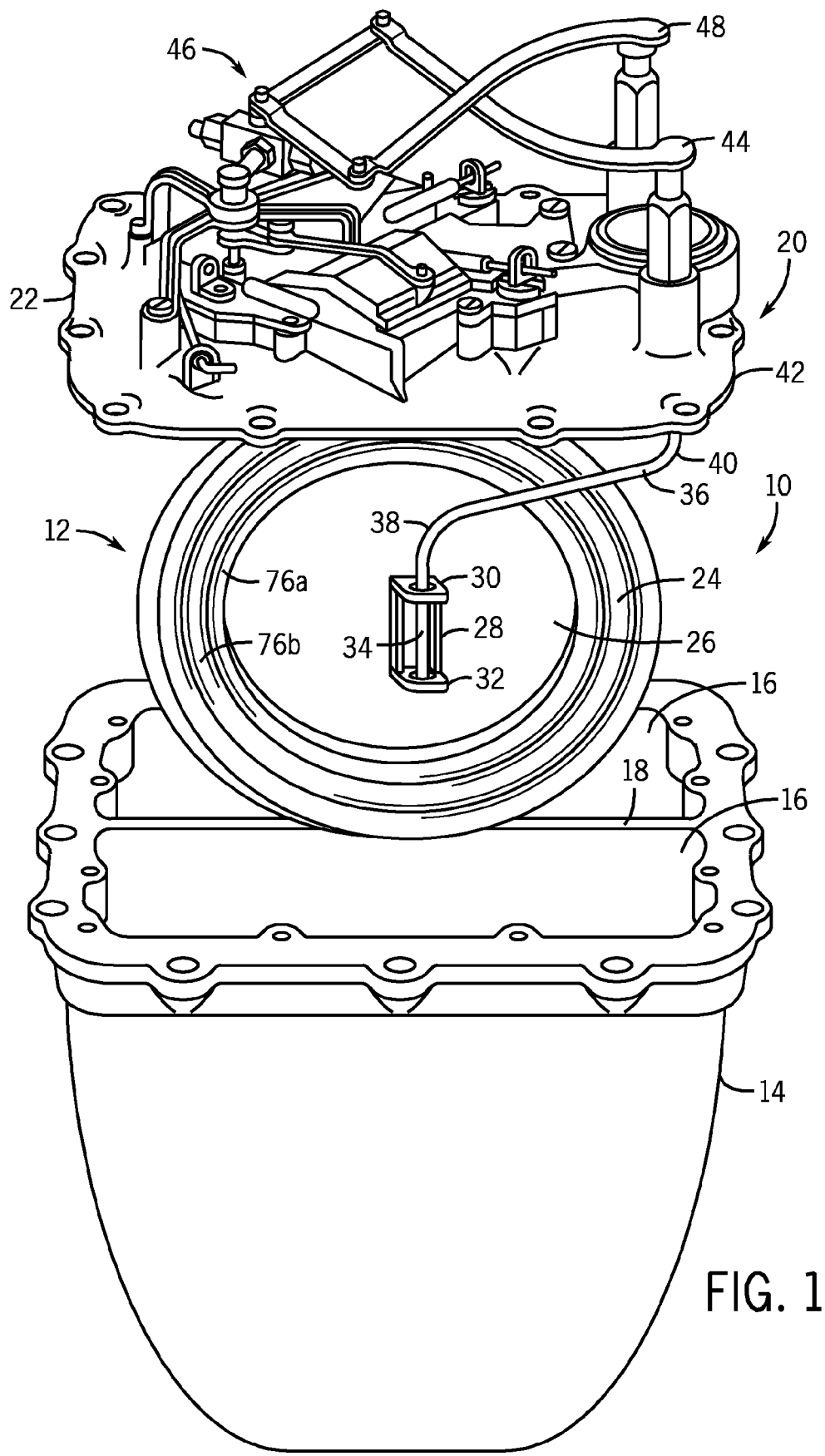
FIG. 1 is a front perspective view of a diaphragm-type gas meter utilizing the convoluted diagram of the present disclosure.

FIG. 1 is a front perspective view of a gas meter 10 constructed in accordance with the present disclosure. The gas meter 10 is a generally conventional residential diaphragm-type gas meter including a diaphragm assemblies 12 constructed in accordance with the present disclosure. As an example, the residential gas meter 10 shown in FIG. 1 could be the Sensus Metering Systems Model R-275 residential gas meter. Various other residential gas meters 10 could be utilized while operating within the scope of the present disclosure.

The gas meter 10 includes a meter housing 14. The meter housing 14 includes a pair of diaphragm chambers 16 separated by a center web 18. Each of the diaphragm chambers 16 receives one of the diaphragm assemblies 12. In the embodiment shown in FIG. 1, only a single diaphragm assembly 12 is shown. However, it should be understood that a corresponding second diaphragm assembly is utilized with the gas meter 10 shown in FIG. 1.

As shown in FIG. 1, the diaphragm assembly 12 is part of a larger measuring module 20 that includes the diaphragm assembly 12 and the metering assembly 22. The metering assembly 22 includes a series of valves that direct the supply of gas into the pair of diaphragm chambers 16 to reciprocally move the diaphragm 24 of the diaphragm assembly 12. As illustrated in FIG. 1, a diaphragm disk 26 is attached to the front surface of the diaphragm 24. The diaphragm disk is a rigid element positioned along the front surface of the diaphragm 24. The diaphragm disk 26 includes an attachment bracket 28 that includes a top flange 30 and a bottom flange 32. The attachment bracket 28 receives the lower end 34 of a flag rod 36. The flag rod 36 includes a lower bend 38 and an upper bend 40.

The upper end of the flag rod 36 extends through a top plate 42 and is joined to one end 44 of a meter linkage 46. A second end 48 of the meter linkage is connected to a corresponding flag rod (not shown) for the second diaphragm assembly.

As is well known in the industry, as the diaphragm 24 of the diaphragm assembly 12 reciprocates between an extended position and a retracted position, the movement of the flag rod 36 causes the meter linkage 46 to both open and close valves within the metering assembly 22 and operate a measurement dial for the meter. The configuration of the metering module 20 shown in FIG. 1 is a conventional module, the details of which are well known and thus will not be described in the present disclosure.

Figure 2:
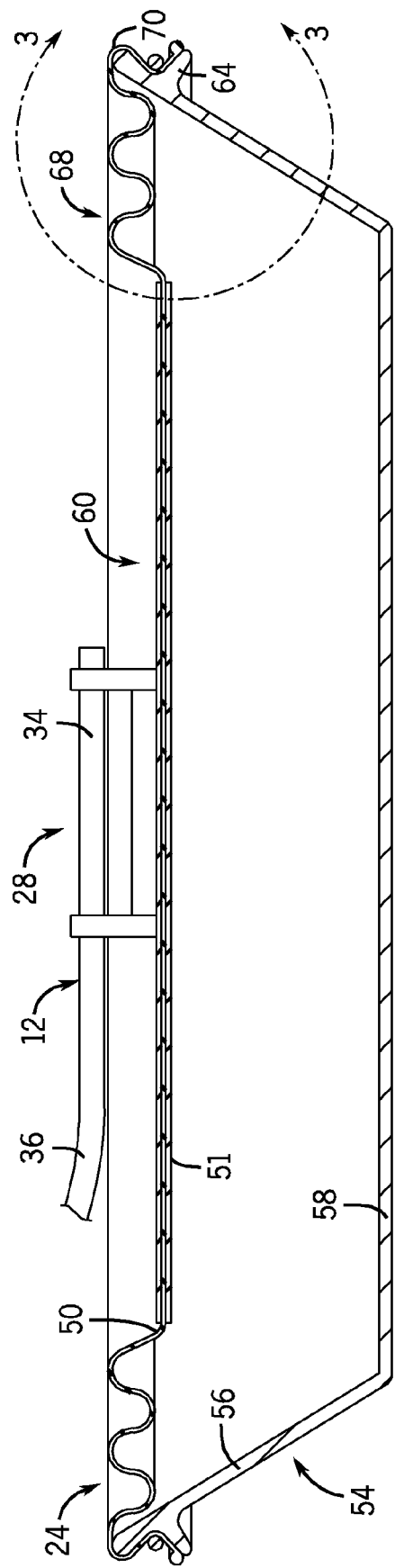
FIG. 2 is a section view of the diaphragm assembly, including the convoluted diaphragm and support pan shown in FIG. 1.

Referring now to FIG. 2, thereshown is a detailed cross-section view of the diaphragm assembly 12 constructed in accordance with the present disclosure. As illustrated in FIG. 2, the diaphragm assembly includes the diaphragm disk 26 mounted to an outer surface 50 of the diaphragm 24 and a diaphragm disk 51 mounted to an inner surface 84 of the diaphragm 24. Specifically, the diaphragm disk 26 is secured to the diaphragm disk 51 by a pair of connectors that pass through the generally planar center section 52 of the diaphragm 24. In this manner, the diaphragm disks 26, 51 sandwich the center section 52 therebetween, as illustrated in FIG. 2. The attachment bracket 28 is secured to the diaphragm disk 26 and receives the first end 34 of the flag rod 36.

As illustrated in FIG. 2, the diaphragm 24 extends across and is supported by a diaphragm pan assembly 54. The pan assembly 54 includes a ported outer wall 56 that extends between a closed back end 58 and an open front end 60. The open front end 60 receives the diaphragm 24, as is clearly illustrated.

Figure 3:
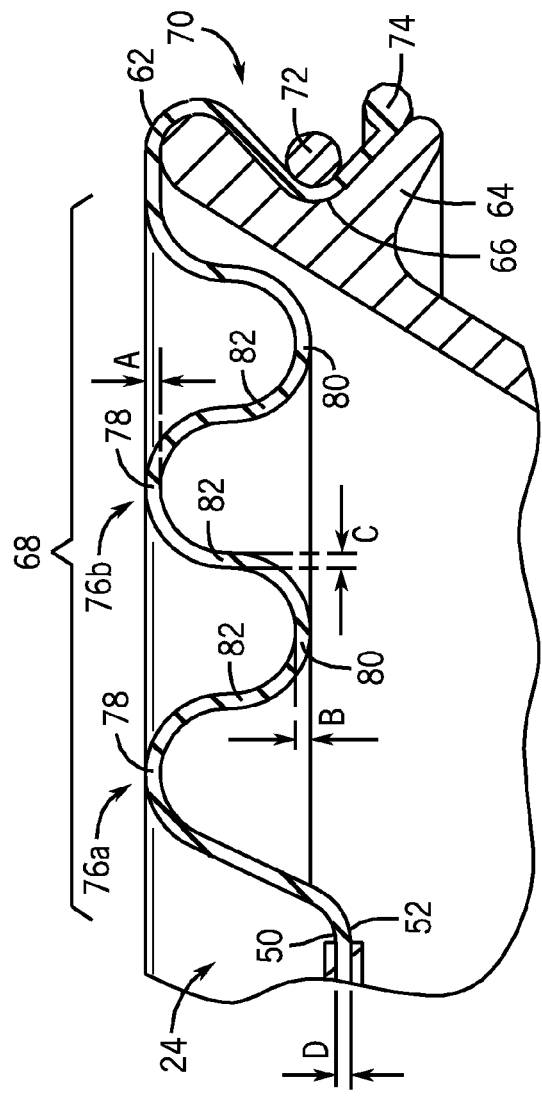
FIG. 3 is a magnified view taken along line 3-3 of FIG. 2.

The outer wall 56 defines the open front end by a curved outer edge surface 62, as best shown in FIG. 3. The outer wall 56 further includes an extending support flange 64 that extends from the outer wall 56 to define a receiving groove 66. The receiving groove 66 extends along the entire outer surface of the pan assembly 54.

Referring back to FIG. 2, the diaphragm 24 further includes an expansion section 68 and an attachment section 70. Specifically, the expansion section 68 is joined to the generally planar center section 52 and allows the diaphragm 24 to reciprocate between the retracted position shown in FIG. 2 and the extended position shown in FIG. 5. The details of the expansion section 68 will be described in greater detail below.

The expansion section 68 is positioned between the center section 52 and the attachment section 70, as is shown in FIG. 2. The attachment device 72 provides retention of the diaphragm 24 such that the diaphragm 24 can be securely attached to the pan assembly 54.

Referring now to FIG. 3, the attachment section 70 extends over the outer edge surface 62 of the outer wall 56 and extends through the receiving groove 66 and over the outer surface of the support finger 64. As illustrated in FIG. 3, a resilient clamping ring 72 extends around the outer circumference of the pan assembly 54 to securely hold the diaphragm 24 in place. In the embodiment shown in FIG. 3, the outermost edge of the diaphragm 24 includes an expanded retaining bead 74.

The retaining bead 74 prevents the outer end of the diaphragm from passing by the clamping ring 72 during repeated use of the diaphragm. Specifically, the retaining bead 74 contacts the clamping ring 72 to prevent the outer end of the diaphragm from becoming disengaged from the diaphragm pan assembly 54.

Referring back to FIG. 3, the expansion section 68 of the diaphragm 24 will be more specifically described. As illustrated in FIG. 3, the expansion section includes a plurality of convolutions 76a, 76b. The expansion sections 76a, 76b are formed concentrically, as can best be seen in FIG. 1. Although a pair of convolutions is shown in FIGS. 1 and 3, it should be understood that a different number of convolutions of varying magnitude, could be utilized while operating within the scope of the present disclosure.

Referring back to FIG. 3, each of the convolutions includes a curved peak 78 and a curved trough 80 that are each joined by a connecting web 82. Specifically, the curved trough 80 of one convolution is joined to the curved peak 78 of the next convolution by a connecting web 82.

As illustrated in FIGS. 2 and 3, the entire diaphragm 24 is formed from a continuous section of material. The material can be formed from woven or loose reinforced or non-reinforced material. Preferably, the entire diaphragm is formed or pressed in a simple two-piece mold utilizing the construction material.

Although the entire diaphragm is preferably constructed as a unitary structure, the diaphragm can have different thicknesses to maintain the rigidity of the diaphragm while allowing each of the convolutions 76a, 76b to roll and flex consistently during the movement between the retracted and extended position.

Referring now to FIG. 3, in one embodiment of the disclosure, the diaphragm has varying thicknesses across the expansion section 68. In the embodiment illustrated, the thickness of each curved peak, represented by A, is approximately 0.018 inches. Likewise, the thickness of the material in each of the curved troughs 80, represented by thickness B, is also 0.018 inches. However, in the embodiment shown in FIG. 3, the thickness of each connecting web 82, shown by C has a reduced thickness of approximately 0.015 inches. The increase in the thickness of the material in the curved peaks 78 and the curved troughs 80 allows the diaphragm to maintain its curved configuration during repeated use. Likewise, the relatively decreased thickness of the material in the connecting webs 82 allows the expansion section to more easily move between the retracted position shown in FIG. 5 and the extended position shown in FIG. 4. In the embodiment illustrated in FIG. 3, the center section 50 has a thickness D of approximately 0.014 inches, which is less than both the thickness of the connecting webs 82, the curved peaks 78 and the curved troughs 80. Further, in the embodiment shown, the entire attachment section 70 has the greater thickness of the curved trough 80 and curved peaks 78 to provide a more durable web for the attachment section 70.

Figure 4:
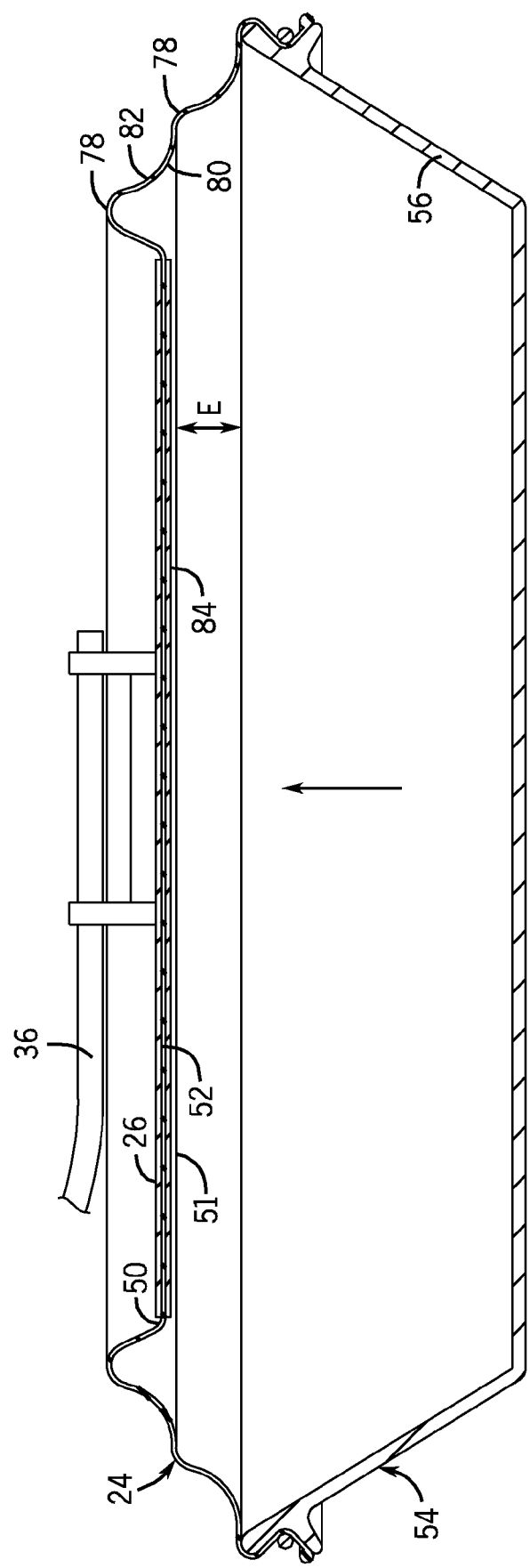
FIG. 4 is a section view similar to FIG. 2 showing the convoluted diaphragm in its extended condition.

As discussed above, FIG. 2 illustrates the diaphragm 24 in its neutral position. In the retracted position, FIG. 5, gas pressure on the outer surface 50 of the diaphragm exceeds the gas pressure on the inner surface 84. However, when the gas pressure on the inner surface 84 increases, as shown in FIG. 4, the entire diaphragm 24 flexes outward to the extended position shown in FIG. 4. As can be seen in FIG. 4, when the diaphragm 24 moves to the extended position, the curved troughs 80 and the curved peaks 78 straighten out to allow the center section 52 and the attached diaphragm disk 26 to move upward by the extension distance E shown in FIG. 4. This movement of the diaphragm disk 26 rotates the flag rod 36, which results in rotation of the measurement dials in the meter assembly.

Figure 5:
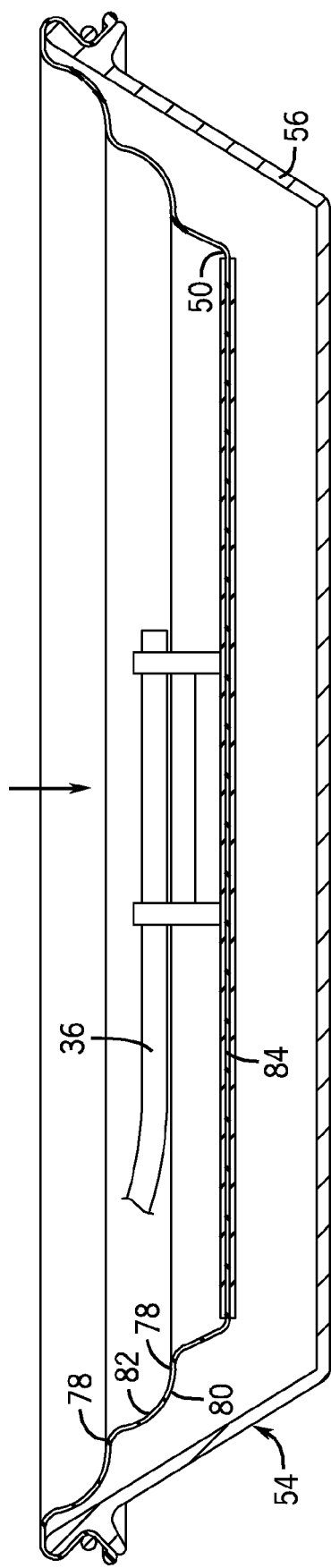
FIG. 5 is a section view similar to FIG. 2 showing the convoluted diaphragm in its retracted condition.

As described previously, the curved peaks 78 and the curved troughs 80 have an expanded thickness relative to the connecting web 82 such that the curved peaks 78 and the curved troughs 80 maintain their curvature upon the return movement of the diaphragm 24 to the retracted position shown in FIG. 5. Additionally, the multiple convolutions in the expansion section 68, as best shown in FIG. 3, provide for increased consistency of movement and eliminate wrinkling and distortion in the diaphragm during the multiple and repeated movements of the diaphragm between the neutral position of FIG. 2, the extended position of FIG. 4, and the retracted position of FIG. 5.

FIGS. 1-4 illustrate only one of the two diaphragm assemblies 12 utilized with the gas meter 10 shown in FIG. 1. A second diaphragm assembly not shown in the drawing figures has an identical configuration to the diaphragm assembly 12 shown in FIG. 1. The combination of the pair of diaphragm assemblies 12 provides the driving arrangement for the metering assembly 22 of the gas meter 10.

In the embodiment shown in FIGS. 1-5, the diaphragm 24 includes a series of equally spaced convolutions 76 that allow the diaphragm to move between the retracted and extended positions. It is contemplated that either a larger or smaller number of convolutions with varying magnitudes could be utilized while operating within the scope of the present disclosure. Further, it is contemplated that the convolutions could be spaced unevenly from each other while also operating within the scope of the present disclosure.

I claim:

1. A diaphragm for use in a gas meter, comprising:
   a generally planar center section;
   a pair of diaphragm disks attached to the center section and positioned on opposite sides of the center section;
   an expansion section joined to the center section; and
   an attachment section joined to the expansion section, wherein the center section, the expansion section and the attachment section are integrally formed from a structural material,
   wherein the expansion section includes a plurality of convolutions formed in concentric rings, each of the convolutions including a plurality of curved peaks separated by a plurality of curved troughs wherein the plurality of curved peaks and the plurality of curved troughs are each joined by a connecting web, wherein the structural material is thicker in both the curved peaks and the curved troughs relative to the connecting web
   wherein the expansion section allows the center section to reciprocally move between an extended position and a retracted position relative to the attachment section.

2. The diaphragm of claim 1 wherein the structural material contains a woven material.

3. The diaphragm of claim 1 wherein the structural material contains a nonwoven material.

4. The diaphragm of claim 1 wherein the attachment section is annular and includes an outer annular sealing bead.

5. The diaphragm of claim 1 wherein the structural material that forms the generally planar center section is thinner than in the expansion section.

6. A diaphragm assembly for use in a gas meter, comprising:
   a support pan having an outer rim;
   a diaphragm attached to the outer rim, the diaphragm comprising:
      a generally planar center section;
      a pair of diaphragm disks attached to the center section and positioned on opposite sides of the center section;
      an annular expansion section joined to the center section; and
      an annular attachment section joined to the expansion section, wherein the center section, the expansion section and the attachment section are integrally formed from a structural material,
   wherein the expansion section includes a plurality of convolutions formed in concentric rings, each of the convolutions including a plurality of curved peaks separated by a plurality of curved troughs, wherein the plurality of curved peaks and the plurality of curved troughs are each joined by a connecting web, wherein the structural material is thicker in both the curved peaks and the curved troughs relative to the connecting web
   wherein the expansion section allows the center section to reciprocally move between an extended position and a retracted position relative to the attachment section; and
   a clamping ring extending around the outer rim of the support pan to secure the diaphragm to the support pan.

7. The diaphragm assembly of claim 6 wherein the attachment section includes an outer annular sealing bead, wherein the clamping ring engages the outer annular sealing bead to prevent removal of the diaphragm.

8. The diaphragm assembly of claim 6 wherein the structural material that forms the generally planar center section is thinner than in the expansion section.

\* \* \* \* \*